United States Patent [19]

Hunerberg

[11] 4,211,523

[45] Jul. 8, 1980

[54] GAS-FLOW CONTROL APPARATUS FOR EQUIPMENT FOR PRODUCING FOAMED PLASTIC

[75] Inventor: Edward C. Hunerberg, Wilbraham, Mass.

[73] Assignee: Hoover Universal, Inc., Saline, Mich.

[21] Appl. No.: 964,744

[22] Filed: Nov. 29, 1978

[51] Int. Cl.$^2$ .......................................... B29D 27/00
[52] U.S. Cl. ..................................... 425/4 C; 261/45; 261/63; 264/50; 425/145; 425/146
[58] Field of Search ............... 425/4 R, 4 C, 145, 146; 264/50; 261/45, 63

[56] References Cited

U.S. PATENT DOCUMENTS

| | | | |
|---|---|---|---|
| 2,575,675 | 11/1951 | Morgan | 261/63 |
| 3,372,528 | 3/1968 | Hoff | 261/63 X |
| 3,975,473 | 8/1976 | Mulvarey | 264/50 X |
| 3,981,649 | 9/1976 | Shimano et al. | 264/50 X |
| 4,043,715 | 8/1977 | Hendry | 264/50 X |
| 4,083,341 | 4/1978 | Brettschneider et al. | 261/45 X |
| 4,107,354 | 8/1978 | Wilkenloh et al. | 264/50 X |

*Primary Examiner*—Philip Anderson
*Attorney, Agent, or Firm*—Olsen and Stephenson

[57] ABSTRACT

Gas-flow control apparatus for delivering a constant volumetric flow of gas to an extruder through which a molten thermoplastic resin is being processed. The gas-flow control apparatus consists of a compressor having an intake and a discharge and is operable to produce a constant volumetric gas flow output. A discharge conduit connects the compressor discharge with the extruder and a feedback loop system consisting of a feedback conduit connects the compressor discharge with the compressor intake and includes a bypass valve. The feedback loop system thus is operable to divert a selected fraction of the compressor output back to the compressor intake thereby to control the volume of gas supplied to the extruder. Flow measuring apparatus measures the volume of the supply gas delivered to the compressor which is equal to the volume of the gas delivered to the extruder and regulates the bypass valve so that a predetermined volumetric flow of gas to the extruder is maintained. A back pressure regulator in the discharge conduit maintains a preselected back pressure on the compressor discharge and the bypass valve to insure a constant volumetric flow of gas to the extruder in spite of pressure variations in the extruder.

13 Claims, 1 Drawing Figure

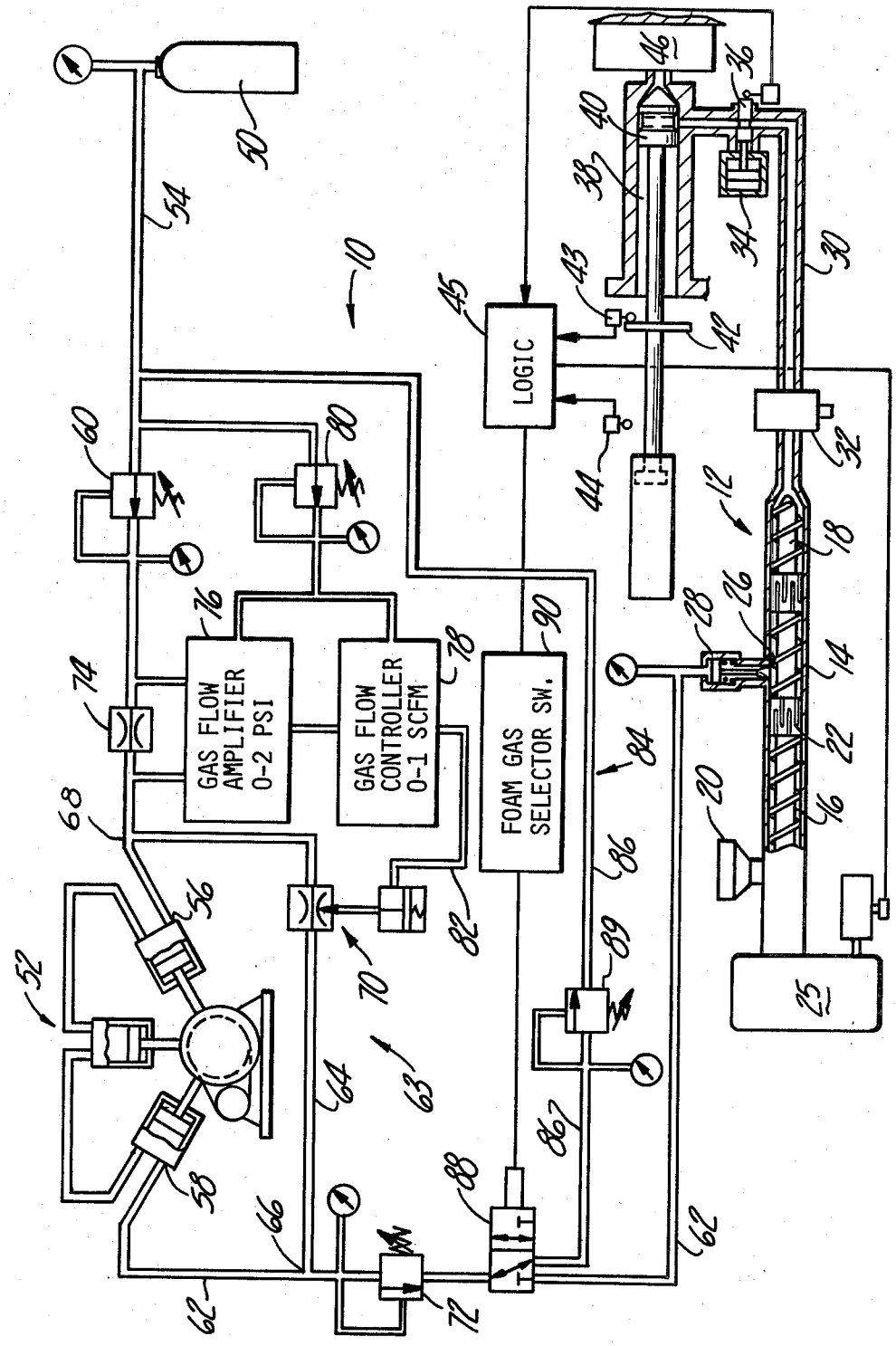

GAS-FLOW CONTROL APPARATUS FOR EQUIPMENT FOR PRODUCING FOAMED PLASTIC

BACKGROUND OF THE INVENTION

The present invention relates generally to the foam molding process, and more particularly, to apparatus for directly injecting an inert gas into molten thermoplastic resin being advanced through an extruder.

The foam molding process is similar to conventional injection molding processes, except that the foamed effect is produced when inert gas is dispersed through the molten thermoplastic resin or polymer melt in the extruder. The inert gas is introduced into the polymer melt either directly or by mixing a chemical blowing agent with the thermo-plastic pellets prior to being fed into the extruder.

The polymer melt with the inert gas dispersed therein is fed into an injection chamber which holds it under a high pressure to prevent its premature expansion. When the injection chamber is filled with a predetermined quantity of the polymer melt, an injection plunger rams the melt into a mold cavity to partially fill it. Because the mold is at much lower pressure than the pressure maintained in the injection chamber, the polymer melt expands and fills the entire mold cavity forming a foamed plastic product having an integral skin formed over a structure having numerous internal cells.

Foam molding offers numerous advantages. The plastic parts produced by this process exhibit high rigidity along with a high strength to weight ratio. Also, the foam molding process enables large parts to be molded without any induced stress, and at a low cost.

The quality of the foamed molded part is direct function of the capability of the equipment to uniformly disperse the proper quantity of gas into the polymer melt. An excessive volume of gas injected into the polymer melt will cause large voids in the molded product thereby reducing its strength and creating visually unacceptable imperfections in the external skin of the part. On the other hand, an insufficient volume of gas will cause the molded part to be denser than is required thus nullifying the benefits of a foamed article, that is, its light weight coupled with high strength.

One common method of introducing gas to a polymer melt utilizes a gas compressor, a gas storage tank connected to the discharge of the gas compressor and a pressure regulating valve disposed in a conduit connecting the gas storage tank with the extruder. The pressure differential method utilizing this apparatus provides for the compressor to deliver gas to the storage tank at extremely high pressures, 3000 psi and higher. The pressure regulating valve is set in the 1500–3000 psi range depending on the requirements of the plastic material and the extruder capacity. The gas flows into the extruder as a result of a pressure differential between the regulator valve and the polymer pressure generated in the extruder chamber. A small differential between these two pressures produces a low volumetric flow rate of the gas to the polymer melt and a large differential between these pressures produces a high volumetric flow rate. The main disadvantage with this method is that the gas flow into the extruder does not remain constant because of the pressure fluctuations in the extruder chamber. These pressure fluctuations are of either a short time span caused by surges of the polymer melt in the extruder or of a long time span caused by long standing changes in the extruder back pressure, temperature and polymer viscosity. Accordingly, these pressure fluctuations vary the pressure differential between the regulator valve and the pressure in the extruder chamber causing either too much or too little gas to be dispersed throughout the molten thermoplastic resin. This uneven gas distribution in the polymer melt causes the molded article to exhibit poor foamed characteristics.

Recently, efforts have been made to provide for the uniform dispersion of the foaming gas throughout the polymer melt. U.S. Pat. No. 4,043,715 discloses a pumping system consisting of a single stage diaphragm compressor driven by a variable speed drive at an adjustable rate. The valve which delivers the gas to the extruder cooperates with the compressor to supply a train of discrete gas pulses. In this manner, discrete gas bubbles are supplied to the polymer melt in an attempt to uniformly disperse the gas throughout the polymer. Such a system fails to respond quickly to the changing volumetric gas requirements in the extruder. A variable speed compressor thus becomes an operational liability.

U.S. Pat. No. 3,981,649 discloses a system in which a constant volumetric flow rate of gas is delivered to the extruder. The gas flow apparatus disclosed in this patent uses a self-regulating valve that automatically responds to pressure changes in the extruder chamber to maintain a constant pressure upstream of itself which results in a constant flow rate of gas to the extruder head. In this patent, the self-regulating valve operates to maintain a constant pressure drop across the valve in order to maintain a constant flow rate through the valve into the extruder head. The flexibility of the system, however, is hampered in that it cannot be readily regulated to accomodate a wide variety of operating conditions. Furthermore, the gas supply must be maintained at undesirably high pressures, creating a dangerous environment for workers.

The objects of the present invention are to provide: apparatus for controlling the volumetric rate of gas into a molten thermoplastic resin in an extruder chamber for producing a foamed thermoplastic resin article having a uniform cell size and distribution; an apparatus which will automatically compensate for pressure variations of the molten resin in the extruder in maintaining a constant volumetric flow rate of gas to the molten resin; an apparatus which will accept a supply gas at an extremely low pressure value and increase this gas to a usable high pressure value in order to provide a safe environment; apparatus that will continue operating when the extruder is shut down; an apparatus which efficiently measures the volumetric gas flow into the extruder chamber and which enables the adjustable regulation of the amount of gas flow into the extruder with a fixed output compressor; and an apparatus which is rugged in construction and capable of operating continuously over long periods of time with a high degree of reliability.

SUMMARY OF THE INVENTION

In accordance with the present invention, a gas flow control apparatus is provided for injecting a continuous stream of foaming gas into a molten thermoplastic resin flowing in an extruder at a constant volumetric flow rate so that the foaming gas can be uniformly dispersed throughout the molten resin. The gas flow control apparatus consists of a fixed speed multi-stage compressor having an intake and a discharge with the intake connected to a gas supply and the discharge connected to an injection port in an extruder barrel. The supply gas is reduced to a extremely low pressure prior to its delivery to the compressor intake. A feedback loop system connects the compressor discharge with the compressor intake and functions to divert a fraction of the compressor output which is set at a fixed volumetric flow rate back to the compressor intake to thereby control the volumetric flow rate of the gas to the extruder.

The feedback loop system includes a conduit having a bypass valve and connecting the compressor discharge with the compressor intake. A self-regulating back pressure valve is disposed downstream from the location where the feedback loop conduit is connected to the discharge conduit and maintains a constant predetermined pressure on the compressor discharge and the bypass valve. Consequently, a constant pressure drop is maintained across the bypass valve in order to return the unused fraction of the compressor output back to the compressor intake at a constant flow rate. Further, the self-regulating back pressure valve maintains a constant pressure on the compressor discharge which enables the compressor to maintain a constant and fixed flow rate output.

The gas flow control apparatus further includes flow rate measuring means which measures the volumetric flow of the supply gas into the compressor intake, the volume of gas being delivered to the compressor intake being equal to the volume of the gas being delivered to the extruder. Consequently, the measure of the volumetric flow rate of the gas to the extruder is taken at a location in the system in which the pressure of the gas is low thus enabling a more accurate and safe method of measuring the flow rate of the gas to the extruder.

The measuring apparatus is connected to the bypass valve and can be set to actuate the bypass valve to divert a predetermined fraction of the compressor output back to the compressor intake and, as a result, the remaining fraction of the compressor output is conveyed to the extruder. If a variation in the volume of the compressor output delivered to the extruder barrel is detected by the gas flow measuring apparatus, it will automatically control the bypass valve to either divert a greater or lesser fraction of the compressor output back to the compressor intake so that the volume flow rate of gas to the extruder barrel is maintained at a preset level.

A secondary bypass loop system is provided enabling the compressor to continue operating when the extruder is shut down. A bypass conduit is connected to the discharge conduit downstream from the self-regulating valve and is connected to the gas supply. A multi-position valve is disposed in the discharge conduit and the bypass conduit and is operable to close the discharge conduit and open the bypass conduit so that the compressor output deliverable to the extruder barrel is diverted through the bypass conduit back to the gas supply. In this manner, the gas control apparatus can continue operating during the short time intervals that the extruder screw is shut down.

Further objects, features, and advantages of the present invention will become apparent from a consideration of the following description when taken in connection with the appended claims and the accompanying drawing which schematically illustrates the gas flow apparatus of the present invention along with an extruder and injection molding apparatus partially shown in section.

With reference to the drawing, the gas control apparatus of the present invention, indicated generally at 10 in the drawing, functions to deliver a predetermined constant volumetric flow of foaming gas to plasticating means in the form of extruder 12 adapted for forming by extrusion a foamed plastic article. The extruder 12 comprises an elongated barrel 14 having a plasticating chamber or head 16 in which a plasticating screw 18 rotates to convey and melt thermoplastic resin deposited in the chamber 16 through a hopper 20. The screw 18 is of a two-stage design with a high pressure barrier 22. Fluted mixers 24 for mixing the molten resin are provided with the screw 18 being driven by the motor means 25.

A gas inlet port 26 is formed in the extruder barrel 16 and receives a check valve 28 through which the foaming gas is injected into the molten thermoplastic resin for dispersion in a uniform manner to provide for the uniform expansion of the plastic foam in a mold. The gas is inert and can include either nitrogen, neon, argon, or helium which is not liquified by high pressure prior to its injection into the extruder chamber 16. Further details of the gas flow control apparatus 10 of the present invention will be described later.

The molten thermoplastic resin and the foaming gas are pushed through the extruder barrel 16 by the rotating screw 18 where the flutes 24 evenly mix and disperse the gas in the molten resin. The molten resin and gas mixture are then conveyed through a conduit 30 past a polymer purge valve 32 whose function is to release molten thermoplastic resin through the atmosphere in order to remove any unwanted thermoplastic resin from the extruder chamber 16 during a cleaning operation, for instance.

The thermoplastic resin then is conveyed past a polymer shut off valve 34 whose valve spool 36 is shown in an open position allowing movement of the thermoplastic resin into an injection chamber 38. Injection plunger 40 is reciprocally movable in the chamber 38 and is moved rearwardly to the left as viewed in the drawing when the chamber 38 is filled with the molten thermoplastic resin and gas mixture. The pressure of polymer and gas mixture in the injection chamber is maintained at a high level, in the range of 1500–3000 psi, to prevent the premature expansion of the polymer. When the injection chamber 38 is filled, a trip arm 42 on the injection plunger 40 engages a switch 44 activating the logic circuit 45. The logic circuit 45 provides for the opening the nozzles (not shown) from the injection chamber 38 to the mold 46 and actuates the polymer shut off valve 34 to close the extruder conduit 30. The logic circuit 45 also shuts down the operation of the extruder screw 18 by turning off the drive motor 25 while the polymer is being injected into the mold 46. The mold cavity is maintained at a low pressure value enabling the expansion of the gas to produce the foamed article. After injection and when switch 43 is engaged, the polymer shut off valve 34 is opened and the extruder 12 is activated to fill the injection chamber 38 to produce another part.

The gas flow control apparatus of the present invention serves to deliver inert gas to the extruder chamber 16 at a constant volumetric flow rate in spite of pressure variations that may exist within the extruder chamber 16. The gas flow control apparatus 10 comprises a gas supply 50 which is a source of any inert gas which will serve as a foaming agent. The gas supply is usually liquid nitrogen ($N_2$) which develops a supply pressure in the 150–200 psi range. This pressure is too low for the gas to be used as a foaming agent and must be elevated to a high pressure. The gas supply 50 is connected to a compressor 52 by means of an intake supply conduit 54. The compressor can be either a multi-stage piston compressor (as shown) or a single stage diaphragm compressor, the multi-stage compressor being preferable because it provides a more accurate output. The compressor 52 has an intake 56 and a discharge 58 and runs continuously at a fixed speed to provide a constant volumetric flow of gas from the discharge 58 which is an important requirement to the accurate injection of a predetermined amount of foaming gas to the extruder.

A compressor intake pressure regulator 60 reduces the pressure of the gas supply down to a low pressure value of approximately 1–2 psi. It is important to note that one advantage of this invention is its ability to operate and accept foaming gas at a low pressure, unlike other systems which require high pressure supply sources. Low supply pressure results in safer operation of the apparatus and longer component life. Accordingly, the foaming gas is supplied at a reduced pressure to the compressor intake 56 where it then is compressed to an elevated pressure and is discharged from the compressor discharge 58. A discharge conduit 62 connects the compressor discharge 58 with the check valve 28 through which the gas is injected into the extruder chamber 16.

The gas flow control apparatus 10 further includes a feedback loop system 63 having a feedback conduit 64 connected to the conduit 62 at juncture 66 and to juncture 68 in the supply conduit 54. The feedback loop system 63 operates to divert a fraction of the compressor output back to the compressor intake 56. The fraction of the compressor output which is diverted back to compressor intake 56 is controlled by a bypass valve 70 disposed in the feedback conduit 64. The bypass valve 70 is controllable to vary the amount of compressor output returned to the compressor intake 56 so that, for example, when the valve 70 is completely opened, the entire output of the compressor 52 is diverted back to the compressor intake 56 so that no gas flows through the conduit 62 to the extruder chamber 16. Thus, control of the orifice opening of the bypass valve 70 controls the volumetric flow of the gas to the extruder 12.

A self-regulating valve 72 is disposed in the discharge conduit 62 and maintains a predetermined constant pressure upstream thereof on the compressor discharge 58 and on the bypass valve 70. The regulator valve 72 maintains a constant pressure drop across the bypass valve 70 in order to return the fraction of gas back to the compressor intake 56 at a constant flow rate that is dependent on the orifice opening of the valve 70. A further purpose of the regulating valve 72 is to isolate the compressor discharge from pressure fluctuations created downstream at the extruder chamber 16 to maintain a constant and fixed flow rate of gas to the extruder chamber 16. Without the valve 72, the feedback system 63 would constantly be correcting for flow rate changes due to pressure variations in the extruder 12.

The gas flow control apparatus 10 is arranged so that the amount of foaming gas used in the extruding chamber 16 will equal the volume of gas drawn in by the compressor intake 56 from the gas supply 50. Gas flow measuring means are provided in the conduit 54 downstream of the pressure regulator 60 to accurately measure the volume of gas being fed into the compressor 52, this volume being equivalent to the volume of gas being supplied to the extruder 12. The measuring means comprises a flow restrictor 74 which has an extremely small orifice that restricts the gas sufficiently to produce a pressure drop of approximately 2 psi, for example, at maximum gas flow through the restrictor 74. This differential pressure drop is linear and proportional to the gas flow through the flow restrictor 74. Thus, the pressure drop across the restrictor 74 is representative of the volume of gas being supplied to the compressor intake 56 which is equal to the amount of gas being conveyed to the extruder 12. A gas flow amplifier 76 is connected across the restrictor 74 and amplifies the small pressure differential senses across the restrictor 74 and provides an amplified pressure signal to a gas flow controller 78. The gas flow amplifier 76 and the controller 78 are each supplied with a constant pressure source of gas from the gas supply 50. The pressure applied to the amplifier 76 and the controller 78 is set by a regulator 80 positioned in a line between the gas supply 50 and the controller 78 and the amplifier 76.

The gas flow controller 78 can be manually adjusted to control the amount of the fraction of the compressor output that is returned to the compressor intake 56. An example of the controller 78 is Model 43AP-ALI, Style B, manufactured by the Foxboro Corporation. The gas flow controller 78 receives an amplified signal from the amplifier 76 and continuously detects the difference between this flow signal and the level at which the controller 78 is set and produces an output control signal that is a function of the difference between the detected flow signal across the restrictor 74 and the set level on the controller 78. This output control signal is transmitted to the flow bypass valve 70 through the conduit 82 so as to automatically open and close the valve 70 in order to maintain a constant flow rate through the restrictor 74 which, as previously indicated, is equal to the level set on the controller 78. In this manner, the volumetric flow rate of the gas to the extruder 12 is controlled.

A secondary bypass loop system 84 is provided enabling the gas-flow control apparatus 10 to continue operation when the extruder 12 is shut down without supplying foaming gas to the extruder 12. The secondary bypass loop system 84 includes a bypass conduit 86 that is connected to the discharge conduit 62 through valve means in the form of a three-way solenoid operated valve 88. The other end of the bypass conduit 86 is connected to the gas supply 50 through the conduit 54 at a location upstream from the regulator 60. A pressure regulator 89 is provided to maintain a constant predetermined upstream pressure when the conduit 86 is in communication with the discharge conduit 62. A foam gas selector switch 90 is a manually operated switch which enables the logic circuitry 45 to be overridden to energize the solenoid operated valve 88 so that the discharge conduit 62 is closed to the extruder 12 but opened by way of the bypass conduit 86 to the conduit 54. The conduits 62, 64, and 86 are as short as possible and are provided with small inner diameters in order to reduce the volumetric capacity of these lines. Because gas is compressible, the small conduits are required to insure prompt response to any changes in the operating conditions of the gas flow control apparatus 10.

In operation, and by way of example, it being understood that various other operating parameters can be established, assume the compressor 52 is a three-stage piston compressor which provides a constant volumetric flow of gas of 1.5 standard cubic feet per minute (SCFM) at 3000 psi. Also, assume that the intake regulator 60 is set so that the gas supply pressure which may be in the range of 150–3000 psi is reduced to 1 psi. The regulator 60 is set so that the source of pressure supplied to the amplifier 76 and the controller 78 is at 20 psi. The regulator 72 is set so that the upstream pressure on the compressor discharge 58 and the bypass valve 70 is 3000 psi. Further assume that the extruder is of such a capacity and that the particular thermoplastic resin is of such a composition that 0.5 SCFM must be injected through the check valve 28 to provide for uniform dispersion of the gas in the molten thermoplastic resin that is flowing through the extruder 12.

Prior to the start-up, the gas flow controller 78 is set at 0 SCFM so that the valve 70 is completely open enabling the entire output of the compressor to be diverted back to the compressor intake 56. Thus, no supply gas is drawn in by the compressor 52 as no gas is discharged into the extruder 12. The operator then will manually set the controller 78 at 0.5 SCFM which is the level at which the volumetric flow rate of gas is to be supplied to the extruder 12. At the instant when the controller 78 is reset, there will be an error or output control signal generated by the gas flow controller 78 since there is no gas flowing through the restrictor 74, the output control signal being a function of the difference between the pressure drop across the restrictor 74 and the set level on the controller 78. The output control will be applied to the bypass valve 70 causing it to begin to close. When the valve begins to close, a reduced fraction of the compressor output will be diverted through the conduit 64 back to the compressor intake 56. Thus, the other remaining fraction of the compressor output will be delivered to the extruder 12 through the conduit 62 and the check valve 28. When the flow controller 78 detects that 0.5 SCFM of the gas is flowing through the restrictor 74, the bypass valve 70 will divert 1 SCFM of the gas back to the compressor intake 56 with the remaining 0.5 SCFM of the compressor output being delivered to the extruder 12. The system is thus in equilibrium.

With the flow rate of 0.5 SCFM being supplied to the extruder 12 in equilibrium, the gas flow control apparatus 10 of the present invention will operate automatically to maintain this level. Assume that the back pressure in the extruder chamber 16 varies such that only 0.4 SCFM is suddenly being delivered to the extruder chamber 16. Since only 0.4 SCFM is being delivered to the extruder 12, the gas flow amplifier 76 detects that only 0.4 SCFM is being delivered to the compressor intake 56 from the gas supply 50. The controller 78 detects the difference between the flow through the restrictor 74 and its set level and generates a signal allowing the bypass valve 70 to reduce the opening of its orifice thereby reducing the flow through the bypass valve 70 which will increase the volumetric flow rate to the extruder 12. This flow reduction through the bypass valve 70 will continue until the flow rate through the restrictor 74 is equal to the set point on the controller 78 (0.5 SCFM). At this time, the system will again be in equilibrium.

When the extruder 12 is shut down, the logic 45 provides for the deenergization of the solenoid valve 88 allowing it to shift to a position where the compressor output that would normally be delivered to the extruder 12 is diverted through the conduit 86 back to the gas supply 56. Extruder shutdown occurs intermittently, that is, during the time the plunger 40 is moved forwardly to inject the polymer melt into the mold 46 and the valve 34 is closed. In this manner, compressor 52 operates continuously maintaining its constant output.

As can be seen from the above description, an improved gas flow control apparatus has been disclosed which provides a constant volumetric flow rate to the extruder 12. The feedback loop system 63 insures that the predetermined volumetric flow rate is supplied to the extruder in spite of pressure variations in the extruder. The flow rate measuring means enables numerous flow rate settings to be established and automatically maintained. Also, the gas flow control apparatus uses only a low pressure gas source which is safer and permits long component life. Measuring the amount of gas used in the plasticating process by measuring the gas supplied to the compressor intake at a low pressure provides for very accurate measurements and control response signals to insure that the proper volumetric flow rate of gas is delivered to the extruder. Finally, the bypass system allows the compressor to operate continuously during the intermittent time periods that the extruder is shutdown.

It is claimed:

1. Gas-flow control apparatus for delivering a selected constant volumetric flow of gas to a plasticating means for dispersion in a polymer being fed through said plasticating means, said gas-flow control apparatus comprising a supply of compressible gas, a compressor having an intake and a discharge and operable to produce a constant volumetric gas flow output with a selected pressure value, supply conduit means connecting said gas supply with said compressor intake to deliver gas from said gas supply to said compressor at a pressure value less than said selected pressure value of said compressor output, discharge conduit means connecting said compressor discharge with said plasticating means, and a feedback loop system including feedback conduit means connected to said compressor discharge and to said compressor intake, said feedback loop system including regulating means controllable to divert a selected fraction of said compressor output to said compressor intake to thereby control the delivery to said plasticating means of said selected constant predetermined volumetric flow of gas.

2. The gas-flow apparatus according to claim 1, wherein said feedback loop system includes a back pressure regulator disposed in said discharge conduit means at a location downstream from the location where said feedback conduit means is connected to said discharge conduit means, said back pressure regulator being operable to maintain a constant back pressure upstream thereof in said discharge conduit means and said feedback conduit means.

3. The gas-flow apparatus according to claim 2, wherein said feedback loop system further includes bypass valve means disposed in said feedback conduit means, said bypass valve means being actuable to vary the fraction of said compressor output diverted to said compressor intake to thereby control the fraction of said compressor output delivered to said plasticating means.

4. The gas-flow apparatus according to claim 3, further including measuring means operable to measure the volumetric flow of supply gas delivered to said compressor intake.

5. The gas-flow apparatus according to claim 4, wherein said measuring means includes flow restrictor means in said gas supply conduit means wherein the pressure drop across said flow restrictor means is representative of the volume of gas flowing into said compressor intake.

6. The gas-flow apparatus according to claim 5, wherein said measuring means further includes pre-settable control means operatively associated with said flow restrictor means and said bypass valve means, said control means being settable to actuate said bypass valve means to divert a predetermined fraction of said compressor output to said compressor intake, said control means being further operable to actuate said bypass valve means in response to measurement of the volume of supply gas delivered to said compressor input to maintain a said predetermined fraction of said compressor output delivered to said compressor intake at a constant level thereby controlling and maintaining a constant volumetric flow of gas to said plasticating means.

7. The gas-flow apparatus according to claim 6, further including control conduit means connecting said measuring means with said gas supply, and pressure regulator means maintaining a fixed pressure value of said gas delivered to said measuring means.

8. The gas-flow control apparatus according to claim 7 further including compressor intake pressure regulator means disposed in said gas supply conduit means at a location upstream from said flow restrictor means and operable to maintain the pressure of supply gas delivered to said flow restrictor means at a predetermined low level.

9. Gas-flow apparatus for delivering a constant volumetric flow of gas to plasticating means for dispersion in a polymer being fed through said plasticating means, said gas-flow control apparatus comprising a gas supply, a compressor having an intake and a discharge and operable to produce a constant volumetric gas output at said discharge, supply conduit means connecting said gas supply with said compressor intake to deliver gas to said compressor, discharge conduit means connecting said compressor discharge with said plasticating means, and a feedback loop system including feedback conduit means connected to said discharge conduit means at a location between said compressor discharge and said plasticating means and to said compressor intake, said feedback loop system being controllable to divert a predetermined fraction of said compressor output to said compressor intake to thereby control the volume of gas delivered to said plasticating means, and a secondary bypass loop system connected to said compressor discharge and to said gas supply operable to divert the gas to be delivered to said plasticating means to said gas supply to enable continuing operation of said compressor without delivering gas to said plasticating means.

10. The gas-flow control apparatus according to claim 9, wherein said secondary bypass loop system includes bypass conduit means connected to said discharge conduit means downstream from the location where said feedback conduit means is connected to said discharge conduit means, and valve means actuable to selectively open and close said discharge and bypass conduit means.

11. The gas-flow control apparatus according to claim 10, wherein said secondary bypass loop system further includes bypass pressure regulator means disposed in said bypass conduit means between said valve means and said gas supply, said bypass pressure regulator means being operable to maintain a predetermined constant back pressure on said discharge conduit means when said valve means is actuated to close said discharge conduit means to said plasticating means and open said bypass conduit means.

12. The gas-flow apparatus according to claim 10, further including selector means operatively associated with said valve means and operable to provide for the selective opening and closing of said discharge and bypass conduit means.

13. Gas-flow control apparatus for delivering gas to an extruder for dispersion in a polymer being fed through said extruder, said gas-flow control apparatus comprising a gas supply, a compressor having an intake and a discharge and operable to produce a constant volumetric gas output, supply conduit means connecting said gas supply with said compressor intake to deliver gas to said compressor, discharge conduit means connecting said compressor discharge with said extruder, a feedback loop system including feedback conduit means connected to said discharge conduit means at a location between said compressor discharge and said extruder and to said compressor intake, said feedback loop system being controllable to divert a selected fraction of said compressor output to said compressor intake to thereby provide for the delivery of a constant volumetric flow of gas to said extruder, compressor intake pressure regulator means operable to maintain a predetermined low pressure value of said gas delivered to said compressor intake, measuring means for measuring the volume of supply gas delivered to said compressor intake, bypass valve means operable to control the volume of gas flowing through said feedback conduit means, means connecting said measuring means with said bypass valve means to maintain a predetermined volumetric gas flow output to said extruder, back pressure regulator means in said discharge conduit means at a location downstream from the location where said feedback conduit means is connected to said discharge conduit means, said back pressure regulator means being operable to maintain a constant predetermined back pressure on said compressor discharge and on said bypass valve means, and relief bypass conduit means connecting said discharge conduit means with said gas supply and selectively operable to divert the fraction of said compressor output deliverable to said extruder to said gas supply.

* * * * *